(12) United States Patent
Liu et al.

(10) Patent No.: US 9,189,631 B2
(45) Date of Patent: Nov. 17, 2015

(54) FIRMWARE AUTHENTICATION

(71) Applicant: Dell Inc, Round Rock, TX (US)

(72) Inventors: Wei G. Liu, Austin, TX (US); Mark W. Shutt, Austin, TX (US)

(73) Assignee: Dell Inc., Round Rock, TX (US)

( * ) Notice: Subject to any disclaimer, the term of this patent is extended or adjusted under 35 U.S.C. 154(b) by 322 days.

(21) Appl. No.: 13/912,330

(22) Filed: Jun. 7, 2013

(65) Prior Publication Data

US 2014/0365755 A1 Dec. 11, 2014

(51) Int. Cl.
*G06F 21/57* (2013.01)

(52) U.S. Cl.
CPC ..................... *G06F 21/572* (2013.01)

(58) Field of Classification Search
CPC ..................................................... G06F 21/572
See application file for complete search history.

(56) References Cited

U.S. PATENT DOCUMENTS

| | | | |
|---|---|---|---|
| 7,797,696 B1 * | 9/2010 | Nallagatla et al. | 717/168 |
| 7,984,286 B2 | 7/2011 | Zimmer et al. | |
| 8,312,258 B2 | 11/2012 | Xing et al. | |
| 8,321,931 B2 | 11/2012 | Zimmer et al. | |
| 8,661,235 B2 * | 2/2014 | Spottswood et al. | 713/2 |
| 2003/0217193 A1 * | 11/2003 | Thurston et al. | 709/321 |
| 2004/0030877 A1 * | 2/2004 | Frid | 713/1 |
| 2011/0138164 A1 * | 6/2011 | Cha et al. | 713/2 |
| 2014/0250291 A1 * | 9/2014 | Adams et al. | 713/2 |

* cited by examiner

*Primary Examiner* — Stefan Stoynov
(74) *Attorney, Agent, or Firm* — Fogarty, L.L.C.

(57) ABSTRACT

Firmware authentication in Information Handling Systems (IHSs) are disclosed. In some embodiments, an IHS may include a controller having a memory, the memory configured to store a plurality of firmware volumes, each of the plurality of firmware volumes including a plurality of firmware files. The IHS may also include a Basic Input/Output System (BIOS) operably coupled to the controller, the BIOS having program instructions stored thereon that, upon execution, cause the BIOS to authenticate two or more firmware files within a given one of the plurality of firmware volumes using a single digital signature. In another embodiment, a method may include creating a firmware volume, adding a plurality of firmware files to the firmware volume, and creating a digital signature based upon at least one of the plurality of firmware files, where the digital signature, upon being authenticated, allows a BIOS to load any of the plurality of firmware files.

20 Claims, 3 Drawing Sheets

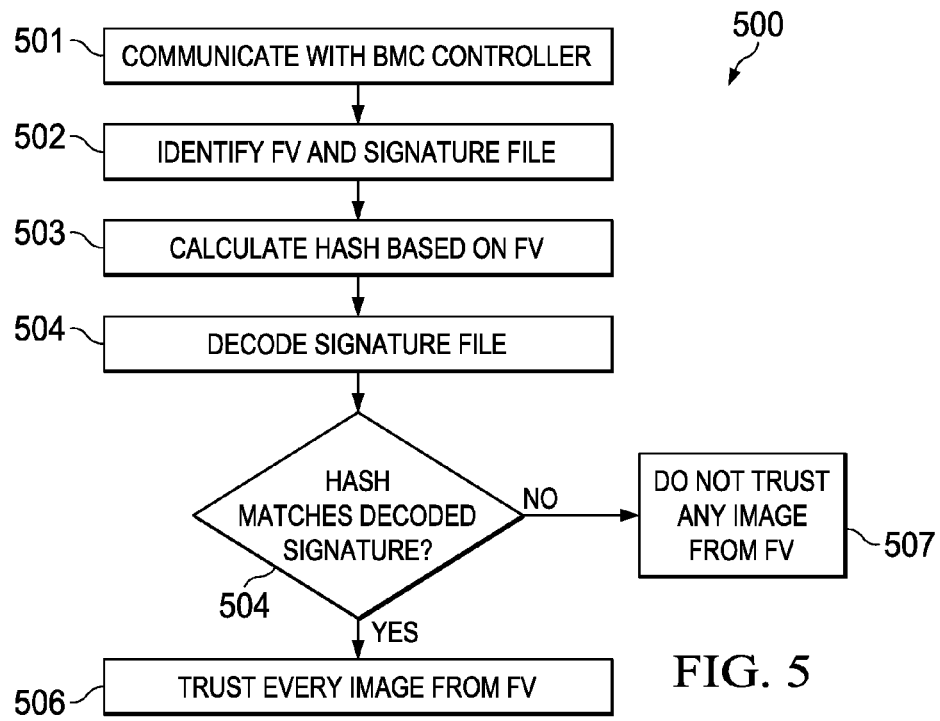
FIG. 5
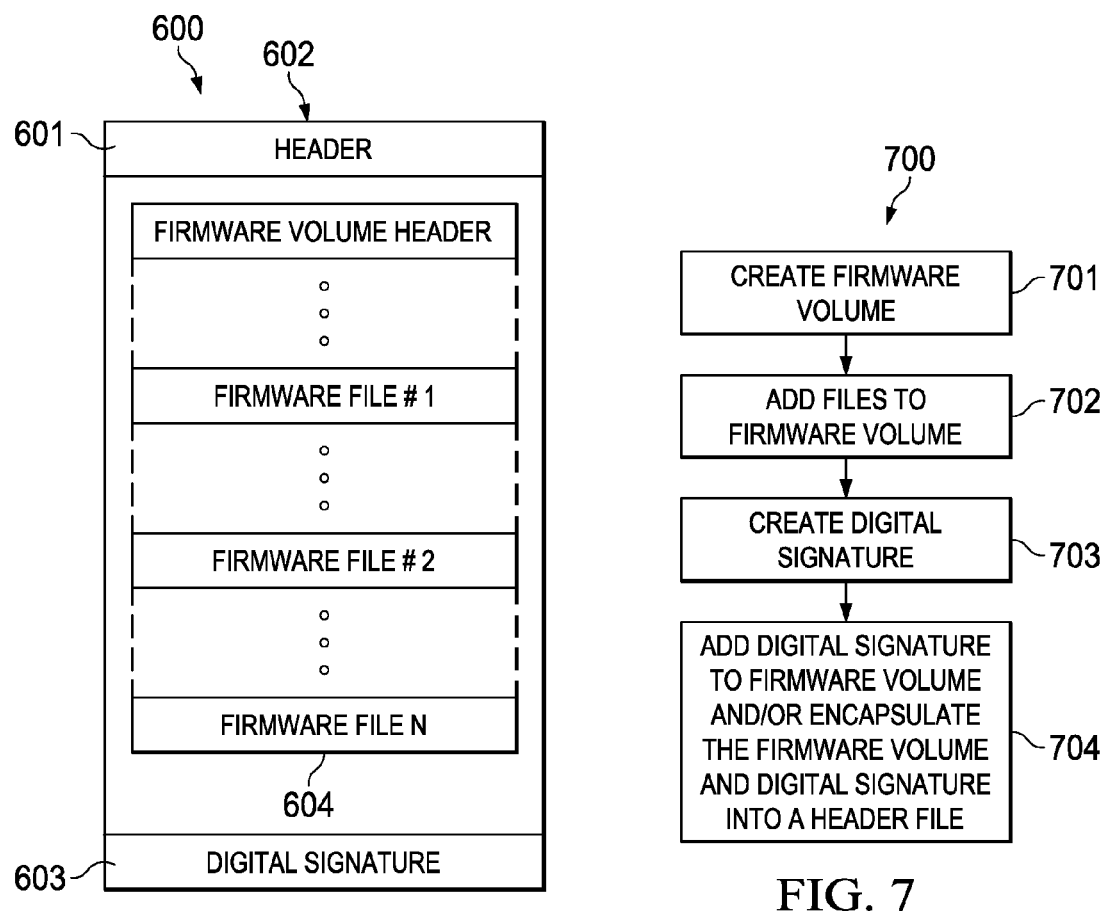
FIG. 6
FIG. 7

FIRMWARE AUTHENTICATION

FIELD

This disclosure relates generally to Information Handling Systems (IHSs), and more specifically, to firmware authentication in IHSs.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some implementations, an IHS may include an electronic component known as a Basic Input/Output System (BIOS). When the IHS is powered on (or reset), a process referred to as "bootstrapping," "booting up," or simply "boot," takes place. During that process, the IHS' BIOS' firmware interface is used to initialize and test other hardware components and/or to load an Operating System (OS) or other programs from a memory.

During bootstrapping, the IHS' Central Processing Unit (CPU)—or, in a multi-processor or multi-core system, a selected one of the available CPUs—acts as a bootstrap processor that runs the BIOS' initialization code. When the CPU starts executing the BIOS' code, it initializes some of the hardware in the machine. Once initialized, the BIOS begins a Power-on Self-Test (POST) procedure, which tests numerous electronic components of the IHS.

Some BIOSs are compliant with the Unified Extensible Firmware Interface (UEFI) specification. In general terms, the UEFI specification is managed by a forum that defines a software interface between an operating system and platform firmware. Recent versions of the UEFI specification include a protocol known as "Secure Boot," which is designed to secure the boot process by preventing the loading of drivers or OS loaders that are not signed with a proper digital signature.

SUMMARY

Embodiments of systems and methods for firmware authentication are described herein. In an illustrative, non-limiting embodiment, an Information Handling System (IHS) may include a controller having a memory, the memory configured to store a plurality of firmware volumes, each of the plurality of firmware volumes including a plurality of firmware files. The IHS may also include a Basic Input/Output System (BIOS) operably coupled to the controller, the BIOS having program instructions stored thereon that, upon execution, cause the BIOS to authenticate two or more firmware files within a given one of the plurality of firmware volumes using a single digital signature.

For example, the BIOS may be Unified Extensible Firmware Interface (UEFI) compliant, and it may be operably coupled to the controller via a southbridge chipset. The given one of the plurality of firmware volumes may be exposed to the BIOS as a virtual mass storage device, for example. The firmware file may include at least one of: a firmware driver, an UEFI application, an Operating System (OS) loader, or an Option Read-Only-Memory (OPROM) file.

In some implementations, the digital signature may be included in a separate file outside the given one of the plurality of firmware volumes. In other implementations, the given one of the plurality of firmware volumes may be encapsulated into a header file, the header file including the digital signature.

In some cases, to authenticate the two or more firmware files, the program instructions, upon execution, may further cause the BIOS to create a hash based upon one of the two or more firmware files, decode the digital signature using a public key stored in the BIOS, and compare the hash to the decoded digital signature. The BIOS may then be configured to authenticate the two or more firmware files in response to the hash matching the decoded digital signature.

In another illustrative, non-limiting embodiment, a method may include creating a firmware volume, adding a plurality of firmware files to the firmware volume, and creating a digital signature based upon at least one of the plurality of firmware files, where the digital signature, upon being authenticated, allows a BIOS to load any of the plurality of firmware files. Again, the firmware files may include at least one of: a firmware driver, an UEFI application, an OS loader, or an OPROM file.

In some cases, the digital signature may be created based upon a hash of a single one of the plurality of firmware files, and the hash may be signed with an authorized private key. Additionally or alternatively, the digital signature may be created based upon a hash of two or more but fewer than all of the plurality of firmware files, and the hash may be signed with an authorized private key. The method may also include adding the digital signature to the firmware volume, storing the digital signature as a distinct file separately from the firmware volume, and/or encapsulating the firmware volume into a header file, where adding the digital signature to the firmware volume includes adding the digital signature to the header file.

In yet another illustrative, non-limiting embodiment, a BIOS may have program instructions stored thereon that, upon execution, cause an IHS to access a firmware volume external to the BIOS, the firmware volume including a plurality of binary firmware files, receive a digital signature associated with the firmware volume, authenticate two or more of the plurality of binary firmware files using the digital signature, and load the two or more binary firmware files during a booting process.

The firmware volume may be stored in a memory device external to the BIOS and accessible to the BIOS via a southbridge chipset as a virtual mass storage device. To authenticate the plurality of binary firmware files, the program instructions, upon execution, may further cause the IHS to create a hash based upon a first one of the plurality of binary firmware files using a same algorithm used in the creation of the digital signature, decode the digital signature using a public key, and compare the hash to the decoded digital signature. The program instructions, upon execution, may further cause the IHS to authenticate the plurality of binary firmware files in response to the hash matching the decoded digital signature.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 is a flowchart of an example of a method for authenticating a firmware volume according to some embodiments.

FIG. 6 is a block diagram of an example of a header file according to some embodiments.

FIG. 7 is a flowchart of an example of a method for creating a signed firmware volume according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of the information handling system may include one or more disk drives, one or more network ports for communicating with external devices as well as various Input/Output (I/O) devices, such as a keyboard, a mouse, touchscreen, and/or a video display. An IHS may also include one or more buses operable to transmit communications between the various hardware components.

Figure 1:
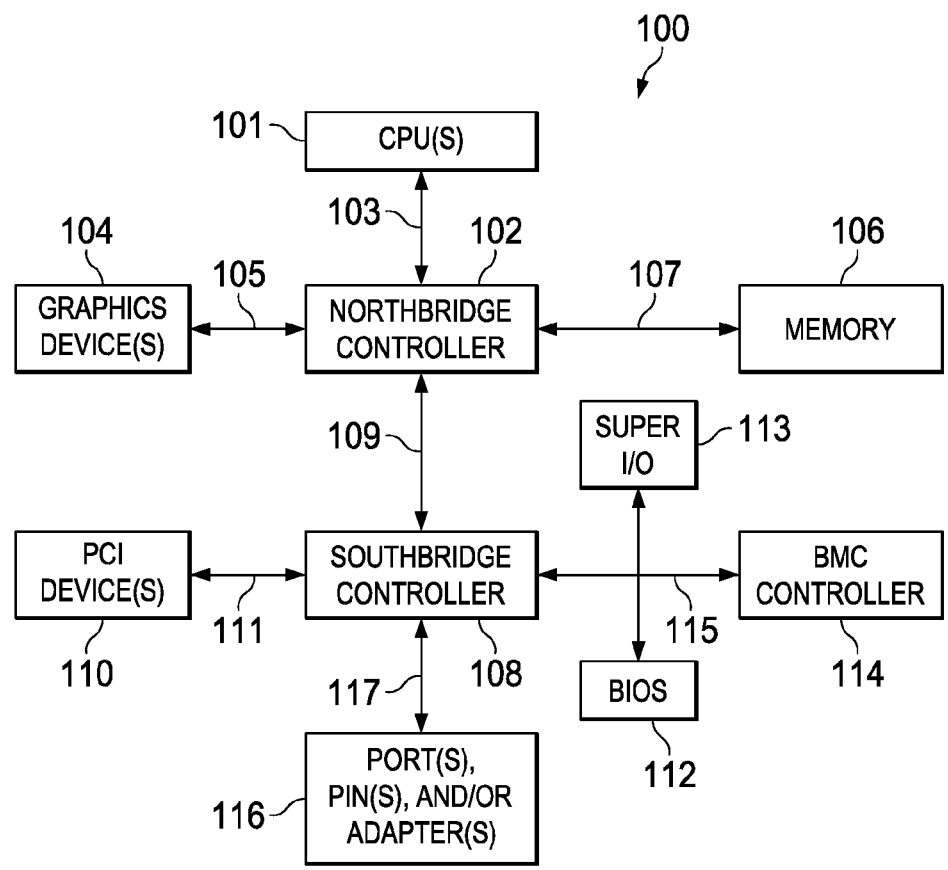
FIG. 1 is a block diagram of an example of an Information Handling System (IHS) according to some embodiments.

To further illustrate the foregoing, FIG. 1 is a block diagram an example of an IHS according to some embodiments. As shown, IHS 100 includes one or more CPUs 101. In various embodiments, IHS 100 may be a single-processor system including one CPU 101, or a multi-processor system including two or more CPUs 101 (e.g., two, four, eight, or any other suitable number). CPU(s) 101 may include any processor capable of executing program instructions. For example, in various embodiments, CPU(s) 101 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 101 may commonly, but not necessarily, implement the same ISA.

CPU(s) 101 are coupled to northbridge controller or chipset 102 via front-side bus 103. Northbridge controller 102 may be configured to coordinate I/O traffic between CPU(s) 101 and other components. For example, in this particular implementation, northbridge controller 102 is coupled to graphics device(s) 104 (e.g., one or more video cards or adaptors, etc.) via graphics bus 105 (e.g., an Accelerated Graphics Port or AGP bus, a Peripheral Component Interconnect or PCI bus, etc.). Northbridge controller 102 is also coupled to system memory 106 via memory bus 107. Memory 106 may be configured to store program instructions and/or data accessible by CPU(s) 101. In various embodiments, memory 106 may be implemented using any suitable memory technology, such as static RAM (SRAM), synchronous dynamic RAM (SDRAM), nonvolatile/Flash-type memory, or any other type of memory.

Northbridge controller 102 is coupled to southbridge controller or chipset 108 via internal bus 109. Generally speaking, southbridge controller 108 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 116 over bus 117. For example, southbridge controller 108 may be configured to allow data to be exchanged between IHS 100 and other devices, such as other IHSs attached to a network. In various embodiments, southbridge controller 108 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 108 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 108 is further coupled to one or more PCI devices 110 (e.g., modems, network cards, sound cards, video cards, etc.) via PCI bus 111. Southbridge controller 108 is also coupled to Basic I/O System (BIOS) 112, Super I/O Controller 113, and Baseboard Management Controller (BMC) 114 via Low Pin Count (LPC) bus 115.

BIOS 112 includes non-volatile memory having program instructions stored thereon. Those instructions may be usable CPU(s) 101 to initialize and test other hardware components and/or to load an Operating System (OS) onto IHS 100. As such, BIOS 112 may include a firmware interface that allows CPU(s) 101 to load and execute certain firmware, as described in more detail below. In some cases, such firmware may include program code that is compatible with the Unified Extensible Firmware Interface (UEFI) specification, although other types of firmware may be used.

BMC controller 114 may include non-volatile memory having program instructions stored thereon that are usable by CPU(s) 101 to enable remote management of IHS 100. For example, BMC controller 114 may enable a user to discover, configure, and manage BMC controller 114, setup configuration options, resolve and administer hardware or software problems, etc. Additionally or alternatively, BMC controller 114 may include one or more firmware volumes, each volume having one or more firmware files used by the BIOS' firmware interface to initialize and test components of IHS 100.

Super I/O Controller 113 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 106. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 102 and/or southbridge controller 108.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 102 may be combined with southbridge controller 108, and/or be at least partially incorporated into CPU(s) 101. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
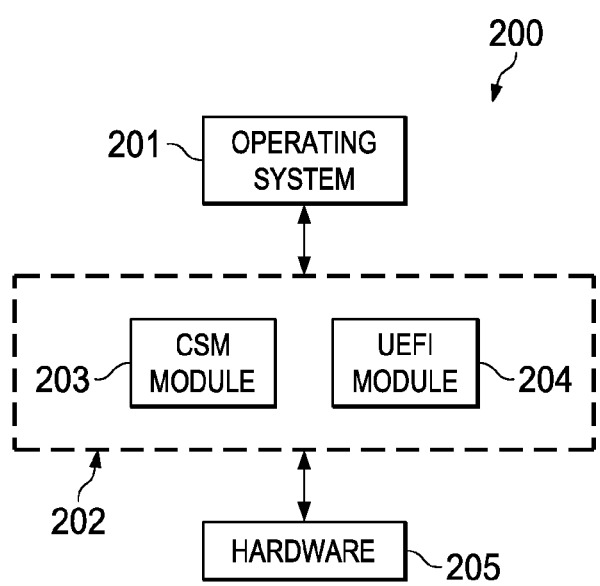
FIG. 2 is a block diagram of a high-level software architecture that illustrates aspects of Unified Extensible Firmware Interface (UEFI) that may be utilized in some embodiments.

FIG. 2 shows a block diagram of a high-level software architecture 200 that illustrates aspects of Unified Extensible Firmware Interface (UEFI) that may be utilized in some embodiments, and implemented within IHS 100. With reference to IHS 100 of FIG. 1, certain instruction code may be used as an intermediary between hardware components 205 (e.g., graphics devices 104, PCI devices 110, other devices 116, etc.) and OS 201 executed by CPU(s) 101. That instruction code may be stored in BIOS 112. Particularly, BIOS 112 may provide a set of software routines that allow OS 201 to interact with hardware 205 of IHS 100 using software calls or the like.

The UEFI specification describes UEFI module or interface 204 to be used by OS 201 to access hardware 205 via firmware 202. In particular, the UEFI specification defines the interface that OS 201 may use in booting and accessing hardware. In this example, both UEFI module 204 and BIOS compatibility support module (CSM) 203 may be present in the firmware 202. This allows for a heterogeneous environment of OSs and device drivers that may support either UEFI or legacy BIOS interfaces. For example, CSM 203 may enable OS 201 and applications to make legacy BIOS function calls. Additional details regarding UEFI module 204 are provided below.

Figure 3:
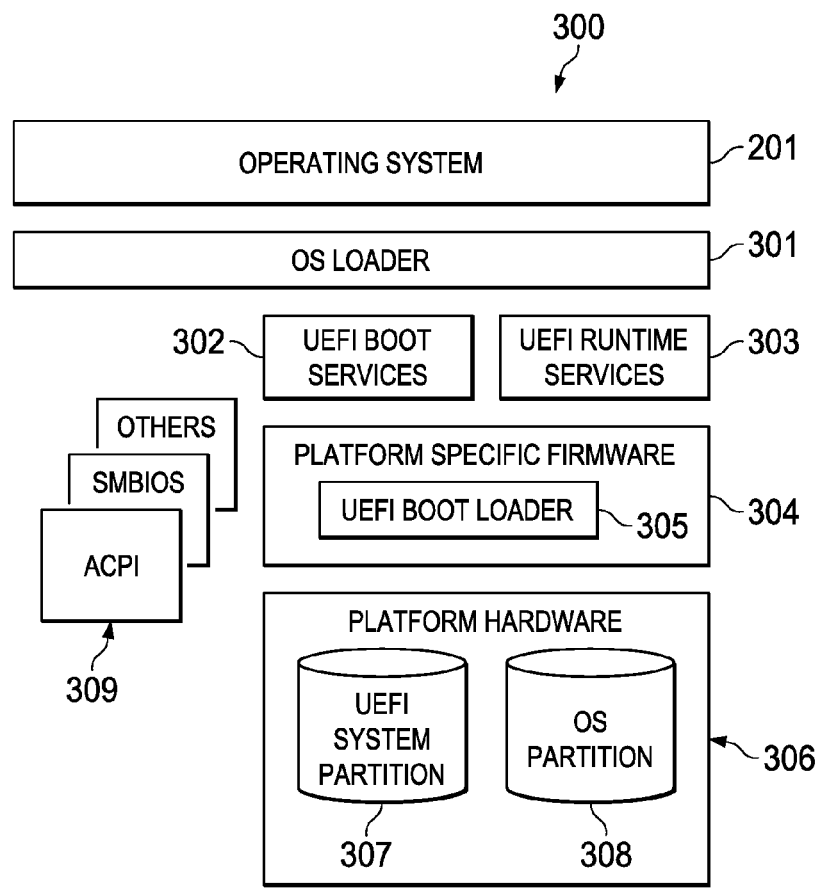
FIG. 3 is a block diagram of a software architecture that illustrates aspects of a UEFI module or interface that may be utilized in some embodiments.

FIG. 3 shows a block diagram of a software architecture 300 that illustrates aspects of a UEFI module or interface 204 that may be utilized in some embodiments. Specifically, software architecture 300 includes platform hardware 306 and OS 201. Platform firmware 304 may retrieve OS program code from UEFI system partition 307 using OS loader 301, also known as a boot loader or OS boot loader. OS loader 301 may retrieve OS program code from other locations, including from attached peripherals or from firmware 202 itself. UEFI system partition 307 may be a shareable system partition. As such, UEFI system partition 307 defines a partition and file system designed to allow safe sharing of mass storage between multiple vendors. OS partition 308 may also be present.

Once started, OS loader 301 continues to boot OS 201, potentially loading it in stages. OS loader 301 may use EFI boot services 302 to support other specifications 309. Examples of other supported specifications 309 include, but are not limited to, Advanced Configuration and Power Management Interface (ACPI), System Management BIOS (SM-BIOS), etc.

UEFI boot services 302 provide interfaces for devices and system functionality that can be used during boot time. UEFI runtime services 303 are available to OS loader 301 during the boot phase and to OS 201 when running. For example, runtime services 303 may be presented to ensure appropriate abstraction of base platform hardware resources that may be needed by OS 201 during normal operation. UEFI allows extension of platform firmware by loading EFI drivers and EFI application images which, when loaded, have access to UEFI runtime and boot services.

Various program modules provide the boot and runtime services. These program modules may be loaded by UEFI boot loader 305 at system boot time. EFI boot loader 305 is a component in the UEFI firmware that determines which program modules should be explicitly loaded and when. Once the UEFI firmware is initialized, it passes control to boot loader 305. Boot loader 305 is then responsible for determining which program modules to load and in which order. It should be appreciated that both OS 201 and the firmware 202 provide a runtime environment for other application programs.

In some implementations, the modules or blocks shown in FIGS. 2 and 3 may represent sets of software routines, logic functions, and/or data structures that, when executed by hardware circuitry, perform certain operations. Although these modules are shown as distinct logical blocks, in other embodiments at least some of the operations performed by these modules may be combined into fewer blocks. Conversely, any given module may be implemented such that its operations are divided among two or more logical blocks. Although shown with a particular configuration, in other embodiments these various modules or blocks may be rearranged in other suitable ways.

In some embodiments, BMC controller 114 of FIG. 1 may carry a large number of UEFI drivers or images in each of its virtual mass storage partitions. During a Driver Execution (DXE) dispatch phase of the boot process, BIOS 112 may attach a selected one BMC controller 114's partitions (which may be exposed to the host as a USB mass storage device, for example), open its file system, and identify one of a plurality of firmware volume (FV) files (e.g., "system_services.fv"). BIOS 112 may then dispatch drivers from the identified FV. In some cases, each FV may include 20 firmware drivers or more. In other embodiments, however, firmware volumes may be presented to BIOS 112 that originate from sources other than BMC controller 114 (e.g., an actual USB device, a different flash chip other than BIOS that's embedded on the motherboard, etc.).

In the context of the UEFI specification, the Secure Boot protocol may be implemented at least in part by UEFI boot services 302 and/or UEFI boot loader 305 to prevent the loading of drivers or OS loaders that are not signed with an acceptable digital signature. Specifically, UEFI Secure Boot defines how an HIS 100's firmware authenticates a digitally signed UEFI image, such as an OS loader or a UEFI driver stored in a ROM memory, thus providing the capability to ensure that those UEFI images are only loaded in an owner-authorized fashion while ensuring a platform's security and integrity.

With Secure Boot, UEFI drivers and applications that are not carried by BIOS 112 are required to be signed and authenticated. Although drivers stored within BMC controller 114 may developed and validated by a single manufacturer and in theory can be considered internal trusted firmware, those drivers may still have their own update process that is outside the control of BIOS 112. As such, in some cases, extra security and protection may be desirable. Hence, the Secure Boot protocol specifies that each executable file within an FV include its own digital signature. BIOS 112 may then determine, for each driver, whether the digital signature for that individual driver is acceptable to the system.

However, signing and then authenticating each driver individually unduly increases development and boot up time. To address these, and other problems, FIGS. 4-7 illustrate alternative ways of authenticating firmware volumes and/or images according to some embodiments.

Figure 4:
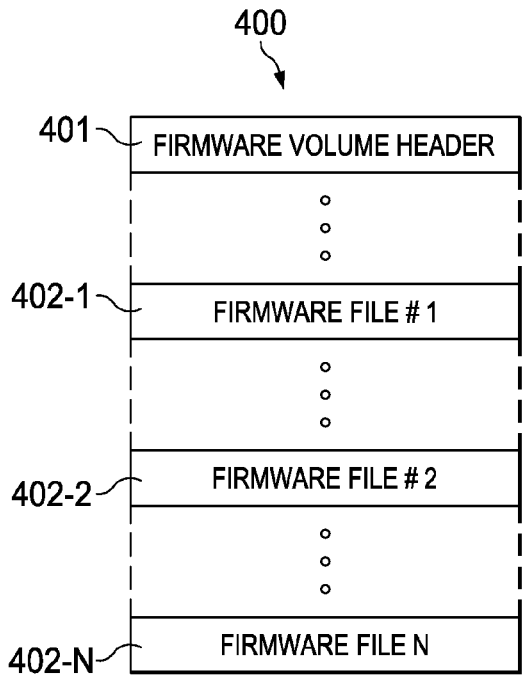
FIG. 4 is a block diagram of an example of a firmware volume according to some embodiments.

FIG. 4 is a block diagram of an example of a firmware volume (FV) 400. In an embodiment, FV 400 may be one of various other FVs stored within a non-volatile memory within BMC controller 114 of FIG. 1. In some cases, although a necessity, the memory of BMC controller 114 may be accessible to BIOS 112 via southbridge controller 108 as a virtual mass storage device. Within that memory, FV 400 is a logical storage repository for data and/or code using UEFI. An FV format describes the binary layout of a firmware are volume.

As shown, FV 400 includes firmware files 402-1 through 402-N. Examples of firmware file(s) 402 include, but are not limited to, firmware boot drivers (e.g., device drivers that are installed in order to start the OS), UEFI applications, OS loaders (e.g., parts of an OS responsible for loading programs), boot firmware images (e.g., software that controls a computer from the time that it is turned on until the primary operating system has taken control), Option Read-Only-Memory (OPROM) files (e.g., firmware files that control bootable peripherals), executables, etc.

Conventionally, each of firmware files 402-1 through 402-N would have its own digital signature, and the Secure Boot protocol would require BIOS 112 to authenticate each digital signature at a time. It should be noted that a conventional FV does not embed certificates and signatures in the volume itself. In fact, the UEFI specification does not describe how FV can be authenticated. In some of the embodiments described herein, FV 400 is associated with a separately stored digital signature file (not shown), which may be used to authenticate the entire FV 400 at once.

In some cases, a separately stored digital signature may be used to authenticate all of firmware files 402-1 through 402-N in a single authentication operation. Additionally or alternatively, the digital signature may be used to authenticate a corresponding subset of two or more, but fewer than all, of firmware files 402-1 through 402-N. Additionally or alternatively, the single digital signature may be used to authenticate firmware files located within or across two distinct FVs.

Despite the presence of use of a digital signature associated with two or more firmware files 402-1 through 402N, it should be noted that one or more of firmware files 402-1 through 402-N may still have its own individual digital signature (not shown). Thus, when executed by a BIOS using the traditional Secure Boot approach, each of firmware files 402-1 through 402-N may also be individually authenticated using their respective signatures.

FIG. 5 is a flowchart of an example of a method for authenticating a firmware volume. In some embodiments, method 500 may be performed, at least in part, by BIOS 112 of FIG. 1 during a POST procedure after BIOS 112 initializes BMC controller 114. At block 501, BIOS 112 communicates with BMC controller 114. For example, such communication may take place via southbridge controller 108, which exposes the non-volatile memory within BMC controller 114 to BIOS 112 as a mass storage device (e.g., virtual USB, etc.). In some cases, BIOS 112 may open the non-volatile memory's File Allocation Table (FAT) file system or the like.

At block 502, BIOS 112 identifies an FV (e.g., FV 400 within BMC controller 114, as well as a digital signature file (e.g., in a separately stored digital signature file) associated with the identified FV. At block 503, BIOS 112 creates a hash based on one or more portions of the FV (or the entire FV), using the same algorithm employed in the creation of the digital signature (e.g., SHA-256, etc.). Then, at block 504, BIOS 112 uses a public key previously stored within it to decode the digital signature.

At block 505, BIOS 112 determines whether the hash matches the decoded digital signature. If so, the every firmware file within the FV may be considered trusted and therefore dispatched. In other words, the individual firmware files within the authenticated FV need not be separately authenticated. Conversely, if the hash does not match the decoded digital signature, then at block 507 the FV is not trusted and its firmware files are not loaded.

In some embodiments, rather than using FV 400, a traditional firmware volume may be encapsulated within a header file. FIG. 6 is a block diagram of an example header file 600 according to some embodiments. Here, header portion file 600 encapsulates one or more firmware volumes 604, which are similar to FV(s) 400. However, digital signature 603 is added to the structure of header file 600.

In some implementations, header file 600 may include a single FV 604. Accordingly, authentication of digital signature 603 may allow every firmware file within FV 604 to be dispatched. In other implementations, header file 600 may include two or more FVs, and authentication of digital signature 603 may allow every firmware file within every FV of header file 600 to be dispatched.

Additionally or alternatively, two or more signatures may be added to header file 600. Header portion 601 may include information as to which FV corresponds to which of the two or more signatures. For example, a first signature may be sufficient to authenticate every firmware file in a first FV, and a second signature may be sufficient to authenticate every firmware file in a second FV. In other cases, header portion 601 may include information as to which specific firmware files within any given FV is authenticated with a selected signature.

To illustrate the foregoing, Table I below shows an example of header information that may be included in header portion 601 and used by BIOS 112 to determine which firmware files and/or FVs match a particular digital signature of header file 600.

TABLE I

| Signature | Volume | Files | ... | Volume | Files |
|---|---|---|---|---|---|
| #1 | FV1 | FF1, FF2, FF3 | ... | FV3 | all |
| #2 | FV2 | all | ... | FV4 | FF4 |
| ... | ... | ... | ... | ... | ... |
| #N | ... | ... | ... | ... | ... |

In this example, N signature files are present in header file 600. Specifically, signature #1 corresponds to first firmware volume FV1, and more specifically to firmware files FF1, FF2, and FF3 within FV1. Signature #1 also corresponds to third firmware volume FV3, and all of its firmware files. Meanwhile, signature #2 corresponds to second firmware volume FV2 and all of its firmware files, as well as to fourth firmware volume FV4 and only firmware file FF4 within FV4. Accordingly, when signature #1 is authenticated, firmware FF1, FF2, and FF3 of FV1 (but not necessarily all other firmware files within FV1), and all firmware files within FV3 are automatically authenticated and dispatched. Similarly, when signature #2 is authenticated, all firmware files within FV2 as well as FF4 within FV4 (but not necessarily all other firmware files within FV4) are automatically authenticated and dispatched.

FIG. 7 is a flowchart of an example of a method for creating a signed firmware volume. In some embodiments, method 700 may be performed, at least in part, by a user or developer operating an IHS or the like. At block 701, the user creates a firmware volume (e.g., FV 400). Then, at block 702, the user adds one or more firmware files (e.g., 402-A through 402-N) to the firmware volume.

At block 703, the user creates a digital signature (e.g., signature 603). For example, the user may use one or more files within the firmware volume (or the entire firmware volume) to create a hash using a suitable hash algorithm (e.g., SHA-256, etc.), and then encrypts the resulting hash with a private key using a suitable encryption algorithm (e.g., public-key cryptography, etc.) to create the digital signature. The private key may be the counterpart private-public key pair of the public key mentioned above in connection FIG. 5 and used by BIOS 112 to later perform a decryption operation. At block 704, the user may then embed the signature into the firmware volume.

Additionally or alternatively, still at block 704, the user may embed the FV within a header file and add the signature to the header file. In some cases, the use may configure the header portion of the header file to associate a particular FV and/or firmware files with the signature, for example, in a manner similar as shown in Table I above.

In some embodiments, the techniques described above may be implemented in IHS 100 to save boot time. Particularly, BIOS 112 no longer has to authenticate each individual firmware file separately—i.e., groups of two or more files (or entire volumes, or even multiple volumes) may be authenticated concurrently and without compromising security. In addition, these techniques may save development time, at least insofar as a development team no longer has to sign each and every executable file or driver that is delivered.

It should be understood that the various operations described herein, particularly in connection with FIGS. 5 and 7, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a controller including a memory configured to store a plurality of firmware volumes, wherein each of the plurality of firmware volumes includes a plurality of firmware files, wherein all of the plurality of firmware volumes are encapsulated into a header file, wherein the header file includes a table that lists a plurality of digital signatures, wherein the table associates each digital signature with a different set of firmware file(s) within each firmware volume, and wherein each set of firmware file(s) can be authenticated its associated digital signature; and
a Basic Input/Output System (BIOS) operably coupled to the controller, the BIOS having program instructions stored thereon that, upon execution, cause the BIOS to authenticate two or more firmware files using a single digital signature, wherein a first one of the two or more firmware files belongs to a first firmware volume and a second one of the two of more firmware files belongs to a second firmware volume distinct from the first firmware volume, and wherein at least one of the first or second firmware volumes includes at least one firmware file that cannot be authenticated using the digital signature.

2. The IHS of claim 1, wherein the BIOS is Unified Extensible Firmware Interface (UEFI) compliant.

3. The IHS of claim 1, wherein the BIOS is operably coupled to the controller via a southbridge chipset.

4. The IHS of claim 3, wherein a given one of the plurality of firmware volumes is exposed to the BIOS as a virtual mass storage device.

5. The IHS of claim 1, wherein the firmware files include at least one of: a firmware driver, an UEFI application, an Operating System (OS) loader, or an Option Read-Only-Memory (OPROM) file.

6. The IHS of claim 1, wherein the digital signature is included in a separate file outside the given one of the plurality of firmware volumes.

7. The IHS of claim 1, wherein the header file includes the given digital signature.

8. The IHS of claim 1, wherein to authenticate the two or more firmware files, the program instructions, upon execution, further cause the BIOS to create a hash based upon one of the two or more firmware files, decode the digital signature using a public key stored in the BIOS, and compare the hash to the decoded digital signature.

9. The IHS of claim 8, wherein the BIOS is configured to authenticate the two or more firmware files in response to the hash matching the decoded digital signature.

10. A method, comprising:
creating a header file including a table and a plurality of firmware volumes, wherein each firmware volume includes a plurality of firmware files, wherein the table lists a plurality of digital signatures, wherein each digital signature is associated with a different set of firmware file(s) within each firmware volume, and wherein each set of firmware file(s) can be authenticated its associated digital signature;
adding firmware file to a given firmware volume; and
creating a digital signature based upon the firmware file, wherein the digital signature, upon being authenticated, allows a Basic Input/Output System (BIOS) to load two or more firmware files, wherein a first one of the two or more firmware files belongs to a first firmware volume and a second one of the two of more firmware files belongs to a second firmware volume distinct from the first firmware volume, and wherein at least one of the first or second firmware volumes includes at least one firmware file that cannot be authenticated using the digital signature.

11. The method of claim 10, wherein the firmware files include at least one of: a firmware driver, a Unified Extensible Firmware Interface (UEFI) application, an Operating System (OS) loader, or an Option Read-Only-Memory (OPROM) file.

12. The method of claim 10, wherein the digital signature is created based upon a hash of a single one of the plurality of firmware files, and wherein the hash is signed with an authorized private key.

13. The method of claim 10, wherein the digital signature is created based upon a hash of two or more but fewer than all of the plurality of firmware files, and wherein the hash is signed with an authorized private key.

14. The method of claim 10, further comprising:
adding the digital signature to the given firmware volume; or
storing the digital signature as a distinct file separately from the given firmware volume.

15. The method of claim 14, wherein adding the digital signature to the firmware volume includes adding the digital signature to the header file.

16. A Basic Input/Output System (BIOS) having program instructions stored thereon that, upon execution, cause an Information Handling System (IHS) to:
access a header file external to the BIOS, the header file including a table and a plurality of firmware volumes, wherein each firmware volume includes a plurality of firmware files, wherein the table lists a plurality of digital signatures, wherein each digital signature is associated with a different set of firmware files, and wherein each set of firmware files can be authenticated using its associated digital signature;
receive a digital signature;
authenticate two or more firmware files using the digital signature, wherein a first one of the two or more firmware files belongs to a first firmware volume and a second one of the two of more firmware files belongs to a second firmware volume distinct from the first firmware volume, and wherein at least one of the first or second firmware volumes includes at least one firmware file that cannot be authenticated using the digital signature; and
load the two or more firmware files during a booting process.

17. The BIOS of claim 16, wherein the first firmware volume is stored in a memory device external to the BIOS and accessible to the BIOS via a southbridge chipset as a virtual mass storage device.

18. The BIOS of claim 16, wherein the two or more firmware files include at least one of: a firmware driver, a Unified Extensible Firmware Interface (UEFI) application, an Operating System (OS) loader, or an Option Read-Only-Memory (OPROM) file.

19. The BIOS of claim 16, wherein to authenticate the two or more firmware files, the program instructions, upon execution, further cause the IHS to:
create a hash based upon one of the two or more firmware files using a same algorithm used in the creation of the digital signature;
decode the digital signature using a public key; and
compare the hash to the decoded digital signature.

20. The BIOS of claim 19, wherein the program instructions, upon execution, further cause the IHS to authenticate the two or more firmware files in response to the hash matching the decoded digital signature.

* * * * *